United States Patent Office 3,169,905
Patented Feb. 16, 1965

1

2

3,169,905
SANITIZING COMPOSITION AND METHOD OF USE

William H. Lambert, 4107 Chippewa, St. Louis, Mo.
No Drawing. Filed May 15, 1961, Ser. No. 109,835
20 Claims. (Cl. 167—42)

This invention relates to improvements in sanitizing compositions and method of applications, and, in particular, is concerned with a sanitizing composition employing finely divided colloidal silica as a carrying agent for the sanitizing composition which can be dispersed in air in finely divided form to provide a sanitizing action for a room and open or enclosed areas.

By means of this invention there has been provided a liquid sanitizing composition in which finely divided colloidal silica is employed that can be sprayed inside a room in finely divided form and which will not settle for long periods of time, thereby providing active sanitizing airborne particles which can kill germs in the air on contact. It is a particular feature of this invention that finely divided pyrogenic colloidal silica is employed of very small particle size, as an example 0.02 micron in size. This colloidal silica is absorbent in nature and the liquid sanitizing composition with the colloidal silica dispersed in it can be dispensed in finely divided form throughout a room to provide a long lasting bacteriocide or fungicide for airborne contaminants.

As a further feature of this invention the sanitizing composition employing the finely divided colloidal silica employs a sanitizing agent which may include several different sanitizing compounds and a film forming agent, whereby the sanitizing composition can be sprayed against the walls and surface of the room to penetrate cracks and crevices to leave a residual plastic-like film that provides a long lasting bacteriocidal surface to provide for decontamination of the surface. The composition may also be used by individuals for germicidal actions adjacent wound or burn areas and upon body areas for general decontamination or prevention of contamination. The composition finds particularly advantageous use in institutions and hospitals and for use by doctors as a coating for their hands underneath their surgical gloves. Thus, a protective film is provided against punctures and the like in the gloves. The sanitizing composition may also be employed by spraying draperies, rugs, bedding, fabrics, leather, and the like, or bathtub or toilet surfaces, and also may be included in wash and scrub waters and polishing agents, and the like. As still a further feature, the colloidal silica in the sanitizing composition, when used in bathtubs, provides an antislip surface to minimize bathroom accidents, besides providing the sanitizing feature above described.

Essentially the sanitizing composition of this invention employs finely divided colloidal silica as a carrying agent, a sanitizing agent, and, desirably, a film forming agent. A solvent is employed, which, for purposes of economy, is preferably water. Water as a solvent is quite desirable for use as it can be used to form an oil and water emulsion and can also be employed to increase the humidity of the room to a desired level of at least about 50%, or more, where most effective sanitizing action is encountered. Also, a spreading agent, which may further act as an emulsifying agent, is desirably employed.

As exemplary illustrations of the agents employed, a quaternary ammonium compound may be one component of the sanitizing agent, and propylene glycol and triethylene glycol may be added to extend the broad spectrum of germicidal and fungicidal activity.

As the film forming agent, polyvinylpyrrolidone may be employed, but it will be understood that other film forming water soluble agents may also be employed, such as the alginates, carboxymethyl cellulose, and the like.

Where polyvinylpyrrolidone is employed as a film forming agent an alkalizing agent is desired to provide the necessary alkaline pH for proper activity, and, as exemplary illustration, trisodium phosphate and sodium borate can be employed. These two compounds are desired for alkalinity and also for their germicidal and disinfectant properties.

It is a further feature that when the quaternary ammonium compound is employed as a sanitizing component the use of the polyvinylpyrrolidone provides not only a film forming function, but also a modifying action upon the quaternary ammonium compound to make it less harsh in its action so that it may be used safely upon human beings and also to preserve the chlorine content in the quaternary ammonium compounds preferably employed.

As exemplary of the spreading agent employed, an alkyl aryl polyether alcohol may be used. This agent not only provides for uniform spreading when the sanitizing composition is sprayed against a wall surface, but also beneficially serves as an emulsifying agent to provide a stable dispersable composition.

The above are the objects of this invention and further objects will appear in the detailed description which follows and will be otherwise apparent to those skilled in the art.

The finely divided silica employed in the sanitizing composition may be a pyrogenic colloidal silica prepared in a hot gaseous environment as by the vapor phase hydrolysis of a silicon compound. This finely divided pyrogenic colloidal silica in a particular size of 0.02 micron, such as CAB-O-SIL manufactured by Godfrey L. Cabot, Inc., covers an area of about 200 square meters for one gram as an illustration of the very high range of covering power. The specific gravity is 2.2 and the product is substantially water-white in color having a refractive index of about 1.46. The oil absorption is approximately 150 pounds of oil per 100 pounds of the colloidal silica and the bulking value is about 0.5 gallon per pound.

The colloidal silica in the finely divided particle range is collected in the form of loosely held clusters, much resembling a group of snow flakes, and the separation of the individual particles is readily accomplished upon dispersion. The colloidal silica is amorphous in nature and is neither a gelatinous nor a porous silica, and has no internal surface area. The enormous external surface area accounts for the highly reactive physical properties of the component whereby when it is dispersed in air and the sanitizing composition attraction exists for air-borne germs, bacteria, and fungi. The fine particle size also accounts for a very uniform dispersion when the colloidal silica is mixed with the sanitizing composition. Additionally, the colloidal silica, through its desirable optical characteristics, provides a clear transparent film when added to transparent film forming agents. In this film the colloidal silica is built up on the surface to be covered much like tiny fish scales to form a homogeneous coating.

The sanitizing agent of this compound can desirably include a quaternary ammonium compound together with alkalizing agents which may additionally form additional sanitizing functions. Thus, as an example, a cationic alkyl aryl polyether quaternary ammonium compound, such as diisobutyl phenoxy ethoxy ethyl dimethyl benzyl ammonium chloride monohydrate, known commercially as Hyamine 1622, manufactured by Rohm & Haas can be employed. When so used, alkalizing agents are desired as the quaternary ammonium compounds most desirably function in an alkaline pH. The alkalizing agents can be as exemplary illustrations trisodium phosphate and sodium borate. The trisodium phosphate is well known for its cleaning and water softening and alkalinity characteristics. To the same extent the sodium borate is employed, but it is somewhat milder in its action. These agents, when used in the proper amounts, provide an alkalinity in the sanitizing composition of about 9.5 to 10.25. The quaternary ammonium compounds are effective in both gram positive and gram negative bacteria.

As an additional component in the sanitizing agent of the composition, glycols are employed. These glycols give broader spectrum protection against bacteria and fungi than the use of the quaternary ammonium compound alone. Thus, they are effective on tuberculosis bacilli, and, as examples, triethylene glycol and propylene glycol are desirably used.

A film forming agent is desirably employed to provide a long lasting protection when the sanitizing composition is sprayed against a wall surface. As an exemplary illustration, polyvinylpyrrolidone is used. This compound is particularly desirable as it acts as a modifying agent for the quaternary ammonium compounds. Thus, it renders the quaternary ammonium compound milder in its action so that the sanitizing composition can be applied to cuts, wounds, and abrasions, and for cleaning and sanitizing wounds without any harsh dermatological or physiological action. Further, the polyvinylpyrrolidone provides, through a certain tackiness, a moisture feature which is desired for absorbability of germs and fungus, and which also serves to keep the quaternary ammonium compounds active and prevents drying out which renders them relatively ineffective. The polyvinylpyrrolidone is non-toxic and compatible in the composition. Further, in addition to its film forming properties, it renders the sanitizing composition of a non-irritant nature. Further, the polyvinylpyrrolidone provides a translucent colorless film, which is desired for application to wall surfaces. The ready solubility of the polyvinylpyrrolidone in water is also a desirable feature as with water as a solvent the humidity in a room may be increased to a desired level of at least about 50% and above relative humidity where most beneficial sanitizing action is accomplished. It is to be understood, however, that other solvents may also be employed, such as alcohol, ether, esters, ketones, chlorinated hydrocarbons, nitro paraffines, amines, and organic acids, such as formic acid and acetic acid. The choice of water or organic solvents makes possible the use of the composition in oil or water base paints to promote the germicidal activity of the paint when freshly applied to a surface. It will also be noted that the glycols previously described may be used to increase tackiness besides the beneficial action as a sanitizing agent.

For use as a spreading agent when the composition is applied against the wall, a compatible detergent is desired. Thus, as an example, an alkyl aryl polyether alcohol, such as Triton X 114, manufactured by Rohm and Haas Company can be utilized. This agent functions as a wetting and spreading agent, detergent, and emulsifying agent, and is of a non-ionic characteristic, which makes it fully compatible with the cationic quaternary ammonium compound previously described. The alkyl aryl polyether alcohol is used as a spreading agent and also is desirably employed as an emulsifying agent for emulsifying the oil and water components of the sanitation composition to provide a stable well dispersed emulsion.

For the purpose of example, there is listed below a preferred embodiment of this invention in the example listed. A preferred composition in concentrated form is shown and in addition the ranges for upper and lower limits of the individual components are set forth. It will be understood that this formulation is for the purpose of example only and that chemical equivalents may be employed.

EXAMPLE

| | Weight in Lbs. | Weight Percent | Weight Percent Range |
|---|---|---|---|
| Water | 1,000 | 50 | 25–80 |
| Triethylene Glycol–Technical | 100 | 5 | 4–15 |
| Alkyl Aryl Polyether Alcohol Triton X 114 | 50 | 2.5 | 1–10 |
| Propylene Glycol | 100 | 5 | 4–15 |
| Diisobutyl Phenoxy Ethoxy Ethyl Dimethyl Benzyl Ammonium Chloride Monohydrate Hyamine 1622 | 500 | 25 | 5–40 |
| Trisodium Phosphate | 100 | 5 | 2–10 |
| Polyvinylpyrrolidone P.V.P.—Type NP-K-30 | 50 | 2.5 | .25–10 |
| Sodium Borate (Borax) | 40 | 2 | 1–8 |
| Colloidal Silica CAB-O-SIL | 60 | 3 | 1–15 |
| | 2,000 | 100 | |

The formulation of this example may be very simply formulated by mixing the components together. The formulation is quite simple to prepare as no critical order of preparation or heating is required. Mixing is simply effected to provide an oil and water dispersion with the finely divided colloidal silica uniformly dispersed through the composition.

The concentrate of the example above is in the form of a 50% solution containing 25% quaternary ammonium compound as an active ingredient. This solution may be further diluted by adding 4 gallons of soft or distilled water to 1 gallon of the concentrate to provide a 10% solution containing 5% quaternary ammonium compound as an active ingredient. This 10% solution is termed a stock use solution which may be further diluted for various purposes.

The stock use 10% solution may be diluted to provide 800 p.p.m. of quaternary ammonium, i.e., 1/1250, by mixing 2 ounces of the stock solution to 1 gallon of water. The diluted 800 p.p.m. solution may be used for room spraying and general sanitation. Where swabbing of the walls of the room is employed, a 400 p.p.m. solution of quaternary ammonium compound is employed by mixing 1 ounce of the 10% stock use solution with 1 gallon of water. For lesser degrees of sanitation, as in wash water, a 200 p.p.m. solution may be employed by mixing 1 ounce of the 10% stock use solution with 2 gallons of water.

*Use*

The sanitizing composition of this invention is very simply employed. The liquid preparation may be very simply dispensed in any degree of dilution through a conventional atomizer, or spray device, into the interior of a room. The dispensing and spraying operation is directed into the central portion of the room in various directions and may be followed up by a closer spraying or swabbing application to the walls and other surfaces so that contaminating surfaces are well covered. In general, it is desirable that the spraying be effected into the interior of the room to bring the relative humidity up to a level of at least about 50%. At lower levels the bacteria are more effective and the aqueous component of the composition, by permitting the relative humidity to be raised, increases the efficiency of the sanitizing composition.

In spraying areas in which a high degree of germicidal action is desired as in hospitals 8 to 16 ounces of the 800 p.p.m. solution previously described are employed per 1000 cubic feet. Smaller amounts and reduced concentrations may be used in other areas where contamination is not such a severe problem.

The very small size of the finely divided pyrogenic colloidal silica, in the order of 0.02 micron, makes possible the dispersion of the sanitizing composition in extremely finely divided form. The composition, when so dispersed in atomized form, settles very, very slowly. Thus, for this particle size of 0.02 micron, a settling life and effectiveness of about six weeks is obtained. It will be understood that the size range is one that is exemplary and that smaller and larger sizes may be employed for slower and faster settling rates. However, the particular particle size of 0.02 micron has been found to work exceedingly well. It should be noted that the settling rate for larger particles, as mentioned above, is faster. Thus, for particles of 0.1 micron, the settling rate is 0.115 inch per hour, and at 1.0 micron the settling rate is 5.04 inches per hour. At a size of 4 microns the settling rate is 68.4 inches per hour.

It has been established that biological contaminants are present in the air as solid or liquid particles as in the form of aerosols, which are suspended in the air and can vary in size from 1 micron to 50 microns, or so. Also, vegetative types of bacteria and fungus, as in the form of spores, and the like, may be present in the air.

The sanitizing composition of this invention when sprayed and atomized into the air kills germs in the air on contact. Thus, by providing a suspended particulate of the finely divided colloidal silica, which has absorbed on its surface the sanitizing agents of this invention, germs and fungus coming in contact therewith are absorbed and killed. The sanitizing composition also, when applied to the surfaces of the walls in the room, penetrates cracks and crevices and forms an invisible sanitizing film, which is quite long lasting.

In the operation of the dispersed sanitizing composition, the polyvinylpyrrolidone provides a source of moisture to the composition as it is somewhat tacky and hydroscopic and enhances and gives a longer life to the quaternary ammonium compounds and the other sanitizing agents of the composition. The protective film, when applied to surfaces, does not affect the gloss, transparency, or opacity of the surface, because of its translucent nature. Further, it may easily be removed with warm water. The composition may be diluted to any desired degree and added to wash and scrub water, many wax polishes, and even to bath water for sanitizing the body of an individual, and can be employed as an overall sanitizing composition, disinfectant, and deodorant. Further, as mentioned previously, it can be applied to the body of the individual in the area of cuts, wounds, and abrasions, to clean and sanitize the wound without germicidal or physiological difficulties, and can be employed in hospitals where a prime source of use is provided.

The composition can be used to thicken medicated salve ointments to any desired consistency. The composition is also distinguished by an improved temperature as by stability and a greater insensitiveness as regards water absorption hydroscopicity, or dilution by tissue fluids without any interference with the properties of this composition as a germicide, fungicide, or bacteriostatic.

Adhesion to the wound area is increased and a protective film forms which prevents recontaminations of the wound due to air-borne or deposited contaminants. This protective film-like bandage is easily removed from the wound without pain or irritation to the patient by using warm water. This makes examination of the wound easy and practically painless to the patient. Re-application of the composition is easy for further healing and protection.

There has been disclosed in this application a typical and preferable embodiment of the sanitizing composition. It will be understood, however, that the sanitizing agents, film formers, and alkalizers and spreading agents and emulsifying agents may be varied through the use of chemical equivalents. Such changes and modifications as are apparent to those skilled in the art and are obvious changes and modifications of this invention are within the scope and teaching of this invention as defined by the claims appended hereto.

What is claimed is:

1. A concentrated water dilutable sanitizing composition consisting essentially of finely divided pyrogenic colloidal silica in the amount of about 1 to 15% by weight, 5 to 74% of a compound consisting of at least one member of the group consisting of a quaternary ammonium compound, an alkalizing agent and a glycol and 25 to 80% of water.

2. A concentrated water dilutable sanitizing composition consisting essentially of finely divided pyrogenic colloidal silica in the amount of about 1 to 15% by weight, .25 to 10% of polyvinylpyrrolidone, 5 to 40% of a quaternary ammonium compound, 4 to 15% of triethylene glycol, 1 to 10% of an alkyl aryl polyether alcohol, 4 to 15% of propylene glycol, 2 to 10% of trisodium phosphate, 1 to 8% of sodium borate and 25 to 80% of water.

3. A concentrated water dilutable sanitizing composition consisting essentially of finely divided pyrogenic colloidal silica having a particle size of about 0.02 micron in the amount of about 1 to 15% by weight, 5 to 74% of a compound consisting of at least one member of the group consisting of a quaternary ammonium compound, an alkalizing agent and a glycol and 25 to 80% of water.

4. A sanitizing composition consisting essentially of finely divided pyrogenic colloidal silica having a particle size of about 0.02 micron in the amount of about 1 to 15% by weight, .25 to 10% of polyvinylpyrrolidone, 5 to 40% of a quaternary ammonium compound, 4 to 15% of triethylene glycol, 1 to 10% of an alkyl aryl polyether alcohol, 4 to 15% of propylene glycol, 2 to 10% of trisodium phosphate, 1 to 8% of sodium borate and 25 to 80% of water.

5. A concentrated water dilutable sanitizing composition consisting essentially of finely divided pyrogenic colloidal silica in the amount of about 3% by weight, about 2.5% of polyvinylpyrrolidone, about 25% of a quaternary ammonium compound, about 2.5% of an alkyl aryl polyether alcohol, about 5% of propylene glycol, about 5% of trisodium phosphate, about 2% of sodium borate and about 50% of water.

6. A concentrated water dilutable sanitizing composition consisting essentially of finely divided pyrogenic colloidal silica having a particle size of about 0.02 micron in the amount of about 3% by weight, about 2.5% of polyvinylpyrrolidone, about 25% of a quaternary ammonium compound, about 2.5% of an alkyl aryl polyether alcohol, about 5% of propylene glycol, about 5% of trisodium phosphate, about 2% of sodium borate and about 50% of water.

7. A method of sanitizing the air in a room comprising providing a liquid sanitizing composition comprising a sanitizing agent and containing finely divided pyrogenic colloidal silica having a particle size of about 0.02 to 0.1 micron uniformly dispersed in said composition and spraying said composition into said room in atomized form.

8. A method of sanitizing the air in a room comprising providing a liquid sanitizing composition comprising a sanitizing agent and containing finely divided pyrogenic colloidal silica having a particle size of about 0.020 micron uniformly dispersed in said composition and spraying said composition into said room in atomized form.

9. A method of sanitizing the air in a room comprising providing an aqueous sanitizing composition comprising a sanitizing agent and containing finely divided pyrogenic colloidal silica having a particle size of about 0.02 to 0.1 micron uniformly dispersed in said composition and spraying said composition into said room in atomized form.

10. A method of sanitizing the air in a room comprising providing an aqueous sanitizing composition comprising a sanitizing agent and containing finely divided pyrogenic colloidal silica having a particle size of about 0.020 micron uniformly dispersed in said composition and spraying said composition into said room in atomized form in an amount to provide a relative humidity of at least 50%.

11. A method of sanitizing the air in a room comprising providing a liquid sanitizing composition comprising a sanitizing agent and containing finely divided pyrogenic colloidal silica uniformly dispersed in said composition and a film forming agent and spraying said liquid composition in atomized form into said room and against the walls of the room.

12. A method of sanitizing the air in a room comprising providing an aqueous sanitizing composition comprising a sanitizing agent and containing a film forming agent and finely divided pyrogenic colloidal silica having a particle size of about 0.02 micron and spraying said composition in atomized form into said room and against the walls of said room.

13. A method of sanitizing the air in a room comprising providing an aqueous sanitizing composition comprising a sanitizing agent and containing a film forming agent and finely divided pyrogenic colloidal silica having a particle size of about 0.02 micron and spraying said composition in atomized form into said room and against the walls of said room in an amount to provide a relative humidity of at least 50%.

14. A method of sanitizing the air in a room comprising providing a liquid sanitizing composition containing finely divided pyrogenic colloidal silica uniformly dispersed in said composition and spraying said composition into said room in atomized form, said sanitizing composition consisting essentially of finely divided pyrogenic colloidal silica in the amount of about 1 to 15% by weight, .25 to 10% of polyvinylpyrrolidone, 5 to 40% of a quaternary ammonium compound, 4 to 15% of triethylene glycol, 1 to 10% of an alkyl aryl polyether alcohol, 4 to 15% of propylene glycol, 2 to 10% of trisodium phosphate, 1 to 8% of sodium borate and 25 to 80% of water.

15. A method of sanitizing the air in a room comprising providing a liquid sanitizing composition containing finely divided pyrogenic colloidal silica uniformly dispersed in said composition and spraying said composition into said room in atomized form, said sanitizing composition consisting essentially of finely divided pyrogenic colloidal silica in the amount of about 3% by weight, about 2.5% of polyvinylpyrrolidone, about 25% of a quaternary ammonium compound, about 2.5% of an alkyl aryl polyether alcohol, about 5% of propylene glycol, about 5% of trisodium phosphate, about 2% of sodium borate and about 50% of water.

16. A method of sanitizing a selected skin area of an individual comprising applying to said area a liquid sanitizing composition comprising a sanitizing agent and containing a finely divided pyrogenic colloidal silica uniformly dispersed in said composition and a water soluble film forming agent.

17. A method of sanitizing a selected skin area of an individual to provide protection against infection of damaged tissue which comprises applying to said area a liquid sanitizing composition comprising a sanitizing agent and containing a finely divided pyrogenic colloidal silica uniformly dispersed in said composition and a water soluble film forming agent, said film forming agent forming a protective film over said selected area by air drying under ambient room conditions.

18. A method of sanitizing a selected skin area of an individual to provide protection against infection of damaged tissue which comprises applying to said area a liquid sanitizing composition comprising a sanitizing agent and containing a finely divided pyrogenic colloidal silica uniformly dispersed in said composition and a water soluble film forming agent, said film forming agent forming a protective film over said selected area by air drying under ambient room conditions and removing said protective film after substantial healing of the damaged tissue by washing with water.

19. A method of sanitizing a selected skin area of an individual to provide protection against infection of damaged tissue which comprises applying to said area a liquid sanitizing composition containing a finely divided pyrogenic colloidal silica uniformly dispersed in said composition and a water soluble film forming agent, said film forming agent forming a protective film over said selected area by air drying under ambient room conditions, said sanitizing composition consisting essentially of finely divided pyrogenic colloidal silica in the amount of about 1 to 15% by weight, .25 to 10% of polyvinylpyrrolidone, 5 to 40% of a quaternary ammonium compound, 4 to 15% of triethylene glycol, 1 to 10% of an alkyl aryl polyether alcohol, 4 to 15% of propylene glycol, 2 to 10% of trisodium phosphate, 1 to 8% of sodium borate and 25 to 80% of water.

20. A method of sanitizing a selected skin area of an individual to provide protection against infection of damaged tissue which comprises applying to said area a liquid sanitizing composition containing a finely divided pyrogenic colloidal silica uniformly dispersed in said composition and a water soluble film forming agent, said film forming agent forming a protective film over said selected area by air drying under ambient room conditions, said sanitizing composition consisting essentially of finely divided pyrogenic colloidal silica in the amount of about 3% by weight, about 2.5% of polyvinylpyrrolidone, about 25% of a quaternary ammonium compound, about 2.5% of an alkyl aryl polyether alcohol, about 5% of propylene glycol, about 5% of trisodium phosphate, about 2% of sodium borate and about 50% of water.

References Cited by the Examiner

UNITED STATES PATENTS

| | | | |
|---|---|---|---|
| 2,059,811 | 11/36 | Sauer | 167—82 |
| 2,830,929 | 4/58 | Fries et al. | 167—39 |
| 2,861,024 | 11/58 | Silver | 167—82 |

OTHER REFERENCES

Rezifilm; Surgery, Gynecology and Obstetrics, February 1960, pp. 205–6.

United States Dispensatory, 25th edition, 1955, pp. 153–4.

JULIAN S. LEVITT, *Primary Examiner.*

M. O. WOLK, LEWIS GOTTS, *Examiners.*